United States Patent
Cote et al.

(10) Patent No.: US 10,768,382 B2
(45) Date of Patent: Sep. 8, 2020

(54) MULTIPORT ASSEMBLIES INCLUDING ACCESS APERTURES AND A RELEASE TOOL

(71) Applicant: CORNING RESEARCH & DEVELOPMENT CORPORATION, Corning, NY (US)

(72) Inventors: Monique Lise Cote, Fort Worth, TX (US); Joel Christopher Rosson, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/204,382

(22) Filed: Nov. 29, 2018

(65) Prior Publication Data
US 2020/0174201 A1 Jun. 4, 2020

(51) Int. Cl.
*G02B 6/38* (2006.01)
(52) U.S. Cl.
CPC ......... *G02B 6/3885* (2013.01); *G02B 6/3821* (2013.01); *G02B 6/3869* (2013.01)
(58) Field of Classification Search
CPC ... G02B 6/3885; G02B 6/3821; G02B 6/3869
USPC .......................................................... 385/77
See application file for complete search history.

(56) References Cited

U.S. PATENT DOCUMENTS

| 3,792,284 A | 2/1974 | Kaelin |
| 4,003,297 A * | 1/1977 | Mott .................... F15B 15/1438 92/78 |
| 4,077,567 A * | 3/1978 | Ginn ........................ F24F 11/74 236/49.4 |
| 4,413,880 A | 11/1983 | Forrest et al. |
| (Continued) | | |

FOREIGN PATENT DOCUMENTS

| CN | 1213783 A | 4/1999 |
| CN | 1646962 A | 7/2005 |
| (Continued) | | |

OTHER PUBLICATIONS

Coaxum, L., et al., U.S. Appl. No. 62/341,947, "Fiber Optic Multiport Having Different Types of Ports for Multi-Use," filed May 26, 2016.
(Continued)

*Primary Examiner* — Akm E Ullah
(74) *Attorney, Agent, or Firm* — Michael E. Carroll, Jr.

(57) ABSTRACT

A multiport assembly includes a shell defining a cavity, a plurality of apertures extending through the shell to the cavity, and a plurality of optical connector ports defining connector insertion paths, a plurality of optical adapter assemblies positioned within the cavity of the shell, and a plurality of sealing piston securing members associated with respective ones of the connector insertion paths, where each of the sealing piston securing members is repositionable between an engaged position, in which at least a portion of the sealing piston securing member intersects the connector (Continued)

insertion path, and a disengaged position, in which a securing portion of the sealing piston securing member is spaced apart from the connector insertion path, and where a width of a button portion of each of the sealing piston securing members is greater than width defined by each of the plurality of apertures.

20 Claims, 8 Drawing Sheets

(56) References Cited

U.S. PATENT DOCUMENTS

| | | | |
|---|---|---|---|
| 4,688,200 A | 8/1987 | Poorman et al. | |
| 4,994,134 A * | 2/1991 | Knecht | G02B 6/3834 |
| | | | 156/294 |
| 5,007,860 A | 4/1991 | Robinson et al. | |
| 5,067,783 A | 11/1991 | Lampert | |
| 5,073,042 A | 12/1991 | Mulholland et al. | |
| 5,212,752 A | 5/1993 | Stephenson et al. | |
| 5,381,494 A | 1/1995 | O'Donnell et al. | |
| 5,408,570 A | 4/1995 | Cook et al. | |
| 5,553,186 A | 9/1996 | Allen | |
| 5,600,747 A | 2/1997 | Yamakawa et al. | |
| 5,631,993 A | 5/1997 | Cloud et al. | |
| 5,647,045 A | 7/1997 | Robinson et al. | |
| 5,748,821 A | 5/1998 | Schempp et al. | |
| 5,781,686 A | 7/1998 | Robinson et al. | |
| 5,791,918 A | 8/1998 | Pierce | |
| 5,862,290 A | 1/1999 | Burek et al. | |
| 5,867,621 A * | 2/1999 | Luther | G02B 6/3825 |
| | | | 385/59 |
| 5,960,141 A | 9/1999 | Sasaki et al. | |
| 6,108,482 A | 8/2000 | Roth | |
| 6,112,006 A | 8/2000 | Foss | |
| 6,206,581 B1 | 3/2001 | Driscoll et al. | |
| 6,375,363 B1 | 4/2002 | Harrison et al. | |
| 6,386,891 B1 * | 5/2002 | Howard | H01R 13/74 |
| | | | 439/731 |
| 6,466,725 B2 | 10/2002 | Battey et al. | |
| 6,678,442 B2 | 1/2004 | Gall et al. | |
| 6,738,555 B1 | 5/2004 | Cooke et al. | |
| 6,771,861 B2 | 8/2004 | Wagner et al. | |
| 7,090,409 B2 * | 8/2006 | Nakajima | G02B 6/266 |
| | | | 385/140 |
| 7,120,347 B2 | 10/2006 | Blackwell, Jr. et al. | |
| 7,266,265 B2 | 9/2007 | Gall et al. | |
| 7,277,614 B2 | 10/2007 | Cody et al. | |
| 7,302,152 B2 | 11/2007 | Luther et al. | |
| 7,330,629 B2 | 2/2008 | Cooke et al. | |
| 7,333,708 B2 | 2/2008 | Blackwell, Jr. et al. | |
| 7,366,416 B2 | 4/2008 | Ramachandran et al. | |
| 7,444,056 B2 | 10/2008 | Allen et al. | |
| 7,489,849 B2 | 2/2009 | Reagan et al. | |
| 7,565,055 B2 | 7/2009 | Lu et al. | |
| 7,621,675 B1 | 11/2009 | Bradley | |
| 7,627,222 B2 | 12/2009 | Reagan et al. | |
| 7,653,282 B2 | 1/2010 | Blackwell, Jr. et al. | |
| 7,680,388 B2 | 3/2010 | Reagan et al. | |
| 7,709,733 B1 | 5/2010 | Plankell | |
| 7,740,409 B2 | 6/2010 | Bolton et al. | |
| 7,753,596 B2 | 7/2010 | Cox | |
| 7,806,599 B2 | 10/2010 | Margolin et al. | |
| 7,844,160 B2 | 11/2010 | Reagan et al. | |
| 7,903,923 B2 | 3/2011 | Gronvall et al. | |
| 7,933,517 B2 | 4/2011 | Ye et al. | |
| 8,025,445 B2 | 9/2011 | Rambow et al. | |
| 8,213,761 B2 | 7/2012 | Gronvall et al. | |
| 8,218,935 B2 | 7/2012 | Reagan et al. | |
| 8,267,596 B2 | 9/2012 | Theuerkorn | |
| RE43,762 E | 10/2012 | Smith et al. | |
| 8,301,004 B2 | 10/2012 | Cooke et al. | |
| 8,466,262 B2 | 6/2013 | Siadak et al. | |
| 8,520,996 B2 | 8/2013 | Cowen et al. | |
| 8,737,837 B2 | 5/2014 | Conner et al. | |
| 8,755,663 B2 | 6/2014 | Makrides-Sarvanos et al. | |
| 8,770,861 B2 | 7/2014 | Smith et al. | |
| 8,821,036 B2 * | 9/2014 | Shigehara | G02B 6/4249 |
| | | | 385/59 |
| 9,158,074 B2 * | 10/2015 | Anderson | G02B 6/3604 |
| 9,684,138 B2 | 6/2017 | Lu | |
| 9,762,322 B1 | 9/2017 | Amundson | |
| 10,038,946 B2 | 7/2018 | Smolorz | |
| 10,114,176 B2 | 10/2018 | Gimblet et al. | |
| 10,268,011 B2 | 4/2019 | Courchaine et al. | |
| 10,359,577 B2 * | 7/2019 | Dannoux | G02B 6/3825 |
| 10,409,007 B2 * | 9/2019 | Kadar-Kallen | G02B 6/3809 |
| 10,520,683 B2 | 12/2019 | Nhep | |
| 2001/0036342 A1 * | 11/2001 | Knecht | G02B 6/3833 |
| | | | 385/84 |
| 2002/0064364 A1 | 5/2002 | Battey et al. | |
| 2002/0081077 A1 | 6/2002 | Nault | |
| 2003/0063866 A1 | 4/2003 | Melton et al. | |
| 2003/0103733 A1 * | 6/2003 | Fleenor | G02B 6/3851 |
| | | | 385/78 |
| 2004/0072454 A1 | 4/2004 | Nakajima et al. | |
| 2004/0157499 A1 | 8/2004 | Nania et al. | |
| 2005/0019031 A1 | 1/2005 | Ye et al. | |
| 2005/0036786 A1 | 2/2005 | Ramachandran et al. | |
| 2005/0129379 A1 | 6/2005 | Reagan et al. | |
| 2005/0175307 A1 | 8/2005 | Battey et al. | |
| 2005/0232552 A1 | 10/2005 | Takahashi et al. | |
| 2005/0281510 A1 | 12/2005 | Vo et al. | |
| 2005/0281514 A1 | 12/2005 | Oki et al. | |
| 2006/0045430 A1 | 3/2006 | Theuerkorn et al. | |
| 2006/0093278 A1 | 5/2006 | Elkins, II et al. | |
| 2006/0093303 A1 * | 5/2006 | Reagan | G02B 6/4457 |
| | | | 385/135 |
| 2006/0120672 A1 | 6/2006 | Cody et al. | |
| 2006/0133758 A1 | 6/2006 | Mullaney et al. | |
| 2006/0133759 A1 | 6/2006 | Mullaney et al. | |
| 2006/0147172 A1 | 7/2006 | Luther et al. | |
| 2006/0153503 A1 | 7/2006 | Suzuki et al. | |
| 2006/0153517 A1 | 7/2006 | Reagan et al. | |
| 2006/0171638 A1 | 7/2006 | Reagan et al. | |
| 2006/0269204 A1 | 11/2006 | Barth et al. | |
| 2006/0269208 A1 | 11/2006 | Allen et al. | |
| 2006/0280420 A1 | 12/2006 | Blackwell, Jr. et al. | |
| 2007/0031100 A1 | 2/2007 | Garcia et al. | |
| 2007/0036483 A1 | 2/2007 | Shin et al. | |
| 2008/0080817 A1 | 4/2008 | Melton et al. | |
| 2008/0138016 A1 | 6/2008 | Katagiyama et al. | |
| 2008/0175542 A1 | 7/2008 | Lu et al. | |
| 2008/0175544 A1 | 7/2008 | Fujiwara et al. | |
| 2008/0175548 A1 | 7/2008 | Knecht et al. | |
| 2008/0264664 A1 | 10/2008 | Dinh et al. | |
| 2008/0273837 A1 | 11/2008 | Margolin et al. | |
| 2009/0041412 A1 * | 2/2009 | Danley | B29D 11/0075 |
| | | | 385/85 |
| 2009/0060421 A1 | 3/2009 | Parikh et al. | |
| 2009/0148101 A1 | 6/2009 | Lu et al. | |
| 2009/0148104 A1 | 6/2009 | Lu et al. | |
| 2009/0185835 A1 | 7/2009 | Park et al. | |
| 2009/0245743 A1 | 10/2009 | Cote et al. | |
| 2009/0263097 A1 | 10/2009 | Solheid et al. | |
| 2010/0008909 A1 | 1/2010 | Siadak et al. | |
| 2010/0014813 A1 | 1/2010 | Ito et al. | |
| 2010/0014867 A1 | 1/2010 | Ramanitra et al. | |
| 2010/0015834 A1 | 1/2010 | Siebens | |
| 2010/0092136 A1 | 4/2010 | Nhep | |
| 2010/0172616 A1 | 7/2010 | Lu et al. | |
| 2010/0197222 A1 | 8/2010 | Scheucher | |
| 2010/0247053 A1 | 9/2010 | Cowen et al. | |
| 2010/0272399 A1 | 10/2010 | Griffiths et al. | |
| 2010/0303426 A1 | 12/2010 | Davis | |
| 2010/0310213 A1 | 12/2010 | Lewallen et al. | |
| 2011/0019964 A1 | 1/2011 | Nhep et al. | |
| 2011/0047731 A1 | 3/2011 | Sugita et al. | |
| 2011/0108719 A1 | 5/2011 | Ford et al. | |
| 2011/0129186 A1 | 6/2011 | Lewallen et al. | |
| 2011/0164854 A1 | 7/2011 | Desard et al. | |
| 2011/0262099 A1 | 10/2011 | Castonguay et al. | |
| 2011/0299814 A1 | 12/2011 | Nakagawa | |
| 2012/0008909 A1 | 1/2012 | Mertesdorf et al. | |

(56) References Cited

U.S. PATENT DOCUMENTS

| | | | |
|---|---|---|---|
| 2012/0106912 A1 | 5/2012 | McGranahan et al. | |
| 2012/0183268 A1 | 7/2012 | De Montmorillon et al. | |
| 2012/0251063 A1 | 10/2012 | Reagan et al. | |
| 2012/0252244 A1 | 10/2012 | Elkins, II et al. | |
| 2013/0004122 A1* | 1/2013 | Kingsbury | G02B 6/4471 385/31 |
| 2013/0034333 A1 | 2/2013 | Holmberg et al. | |
| 2013/0064506 A1* | 3/2013 | Eberle, Jr. | G02B 6/32 385/49 |
| 2013/0109213 A1 | 5/2013 | Chang | |
| 2013/0170834 A1 | 7/2013 | Cho et al. | |
| 2013/0236139 A1* | 9/2013 | Chen | G02B 6/3878 385/60 |
| 2014/0016902 A1 | 1/2014 | Pepe et al. | |
| 2014/0079356 A1 | 3/2014 | Pepin et al. | |
| 2014/0133806 A1 | 5/2014 | Hill et al. | |
| 2014/0133807 A1 | 5/2014 | Katoh | |
| 2014/0161397 A1 | 6/2014 | Gallegos et al. | |
| 2014/0205257 A1 | 7/2014 | Durrant et al. | |
| 2014/0219622 A1 | 8/2014 | Coan et al. | |
| 2014/0233896 A1 | 8/2014 | Ishigami et al. | |
| 2014/0241671 A1 | 8/2014 | Koreeda et al. | |
| 2014/0294395 A1 | 10/2014 | Waldron et al. | |
| 2014/0328559 A1 | 11/2014 | Kobayashi et al. | |
| 2014/0355936 A1 | 12/2014 | Bund et al. | |
| 2015/0003788 A1 | 1/2015 | Chen et al. | |
| 2015/0036982 A1 | 2/2015 | Nhep et al. | |
| 2015/0185423 A1 | 7/2015 | Matsui et al. | |
| 2015/0253528 A1 | 9/2015 | Corbille et al. | |
| 2015/0268434 A1 | 9/2015 | Barnette, Jr. et al. | |
| 2015/0316727 A1 | 11/2015 | Kondo et al. | |
| 2015/0346436 A1 | 12/2015 | Pepe et al. | |
| 2016/0131851 A1 | 5/2016 | Theuerkorn | |
| 2016/0131857 A1 | 5/2016 | Pimentel et al. | |
| 2016/0139346 A1 | 5/2016 | Bund et al. | |
| 2016/0161688 A1 | 6/2016 | Nishimura | |
| 2016/0161689 A1 | 6/2016 | Nishimura | |
| 2016/0209599 A1 | 7/2016 | Van Baelen et al. | |
| 2016/0238810 A1 | 8/2016 | Hubbard et al. | |
| 2016/0246019 A1 | 8/2016 | Ishii et al. | |
| 2016/0259133 A1 | 9/2016 | Kobayashi et al. | |
| 2016/0306122 A1 | 10/2016 | Tong et al. | |
| 2017/0131509 A1 | 5/2017 | Xiao et al. | |
| 2017/0176690 A1 | 6/2017 | Bretz et al. | |
| 2017/0219782 A1 | 8/2017 | Nishimura | |
| 2017/0261699 A1 | 9/2017 | Compton et al. | |
| 2018/0267265 A1* | 9/2018 | Zhang | G02B 6/3825 |
| 2019/0004252 A1* | 1/2019 | Rosson | G02B 6/3837 |

FOREIGN PATENT DOCUMENTS

| | | |
|---|---|---|
| CN | 101195453 A | 6/2008 |
| CN | 201704194 U | 1/2011 |
| CN | 203224645 U | 10/2013 |
| CN | 104064903 A | 9/2014 |
| EP | 0957381 A1 | 11/1999 |
| EP | 1391762 A1 | 2/2004 |
| EP | 3101740 A1 | 12/2016 |
| JP | 63089421 A | 4/1988 |
| JP | 63078908 U | 5/1988 |
| JP | 07318758 A | 12/1995 |
| JP | 08292331 A | 11/1996 |
| JP | 11064682 A | 5/1999 |
| JP | 11326693 A | 11/1999 |
| JP | 2001290051 A | 10/2001 |
| JP | 2003121699 A | 4/2003 |
| JP | 2003177279 A | 6/2003 |
| JP | 2005031544 A | 2/2005 |
| JP | 2005077591 A | 3/2005 |
| JP | 2006023502 A | 1/2006 |
| JP | 2006337637 A | 12/2006 |
| JP | 2007078740 A | 3/2007 |
| JP | 2007121859 A | 5/2007 |
| JP | 2009265208 A | 11/2009 |
| JP | 2010152084 A | 7/2010 |
| JP | 2011033698 A | 2/2011 |
| JP | 2013156580 A | 8/2013 |
| JP | 2014085474 A | 5/2014 |
| JP | 05537852 B2 | 7/2014 |
| JP | 05538328 B2 | 7/2014 |
| JP | 2014134746 A | 7/2014 |
| JP | 03207223 U | 11/2016 |
| KR | 1020130081087 A | 7/2013 |
| WO | 2006113726 A1 | 10/2006 |
| WO | 2012037727 A1 | 3/2012 |
| WO | 2012163052 A1 | 12/2012 |
| WO | 2014151259 A1 | 9/2014 |
| WO | 2014167447 A1 | 10/2014 |
| WO | 2014197894 A1 | 12/2014 |
| WO | 2015144883 A1 | 10/2015 |
| WO | 2016095213 A1 | 6/2016 |
| WO | 2016156610 A1 | 10/2016 |
| WO | 2016168389 A1 | 10/2016 |
| WO | 2019005190 A2 | 1/2019 |
| WO | 2019005191 A1 | 1/2019 |
| WO | 2019005192 A1 | 1/2019 |
| WO | 2019005193 A1 | 1/2019 |
| WO | 2019005194 A1 | 1/2019 |
| WO | 2019005195 A1 | 1/2019 |
| WO | 2019005196 A1 | 1/2019 |
| WO | 2019005197 A1 | 1/2019 |
| WO | 2019005198 A1 | 1/2019 |
| WO | 2019005199 A1 | 1/2019 |
| WO | 2019005200 A1 | 1/2019 |
| WO | 2019005201 A1 | 1/2019 |
| WO | 2019005202 A1 | 1/2019 |
| WO | 2019005203 A1 | 1/2019 |
| WO | 2019005204 A1 | 1/2019 |

OTHER PUBLICATIONS

International Search Report and Written Opinion PCT/US2017/063938 dated May 14, 2018.
International Search Report and Written Opinion PCT/US2017/063953 dated May 14, 2018.
International Search Report and Written Opinion PCT/US2017/063991 dated May 14, 2018.
International Search Report and Written Opinion PCT/US2017/064027 dated Oct. 9, 2018.
International Search Report and Written Opinion PCT/US2017/064063 dated May 15, 2018.
International Search Report and Written Opinion PCT/US2017/064071 dated May 14, 2018.
International Search Report and Written Opinion PCT/US2017/064072 dated May 14, 2018.
International Search Report and Written Opinion PCT/US2017/064077 dated Feb. 26, 2018.
International Search Report and Written Opinion PCT/US2017/064084 dated Feb. 26, 2018.
International Search Report and Written Opinion PCT/US2017/064087 dated Feb. 26, 2018.
International Search Report and Written Opinion PCT/US2017/064092 dated Feb. 23, 2018.
International Search Report and Written Opinion PCT/US2017/064093 dated Feb. 26, 2018.
International Search Report and Written Opinion PCT/US2017/064095 dated Feb. 23, 2018.
International Search Report and Written Opinion PCT/US2017/064096 dated Feb. 26, 2018.
International Search Report and Written Opinion PCT/US2018/039019 dated Sep. 18, 2018.
International Search Report and Written Opinion PCT/US2018/039490 dated Oct. 4, 2018.
International Search Report and Written Opinion PCT/US2018/039494 dated Oct. 11, 2018.
International Search Report and Written Opinion PCT/US2018/040011 dated Oct. 5, 2018.
International Search Report and Written Opinion PCT/US2018/040104 dated Oct. 9, 2018.

(56) References Cited

OTHER PUBLICATIONS

International Search Report and Written Opinion PCT/US2018/040126 dated Oct. 9, 2018.
International Search Report and Written Opinion PCT/US2018/040130 dated Sep. 18, 2018.
Notice of Allowance Received for U.S. Appl. No. 16/018,997 dated Oct. 4, 2018.
Office Action Pertaining to U.S. Appl. No. 16/018,918 dated Sep. 28, 2018.
Office Action Pertaining to U.S. Appl. No. 16/018,988 dated Oct. 31, 2018.
Office Action Pertaining to U.S. Appl. No. 16/109,008 dated Oct. 31, 2018.
Office Action Pertaining to U.S. Appl. No. 16/018,918 dated Sep. 28, 2018, 7 Pgs.
Invitation to Pay Additional Fees of the European International Searching Authority; PCT/US2019/058316; dated Feb. 14, 2020; 12 Pgs.
Faulkner et al. "Optical networks for local lopp applications," J. Lightwave Technol.0733-8724 7(11), 17411751 (1989).
Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Wang et al. "Opto-VLSI-based dynamic optical splitter," Electron. Lett.0013-5194 10.1049/el:20046715 40(22), 14451446 (2004).
Xiao et al "1xN wavelength selective adaptive optical power splitter for wavelength-division-multiplexed passive optical networks," Optics & Laser Technology 68, pp. 160-164, May 2015.

\* cited by examiner

MULTIPORT ASSEMBLIES INCLUDING ACCESS APERTURES AND A RELEASE TOOL

BACKGROUND

Field

The present disclosure relates generally to assemblies for interconnecting or otherwise terminating optical fibers, and more particularly to multiport assemblies for interconnecting optical fiber connectors.

Technical Background

Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles in the network. These terminated optical fibers and fiber optic cables are available in a variety of connectorized formats including, for example, hardened OptiTap® and OptiTip® connectors, field-installable UniCam® connectors, preconnectorized single or multi-fiber cable assemblies with SC, FC, or LC connectors, etc., all of which are available from Corning Incorporated, with similar products available from other manufacturers, as is well documented in the patent literature.

The optical receptacles with which the aforementioned terminated fibers and cables are coupled are commonly provided at optical network units (ONUs), network interface devices (NIDs), and other types of network devices or enclosures, and often require hardware that is sufficiently robust to be employed in a variety of environments under a variety of installation conditions. These conditions may be attributable to the environment in which the connectors are employed, or the habits of the technicians handling the hardware. Consequently, there is a continuing drive to enhance the robustness of these connectorized assemblies, while preserving quick, reliable, and trouble-free optical connection to the network.

BRIEF SUMMARY

According to the subject matter of the present disclosure, multiport assemblies and methods for connecting optical connecters in a multiport assembly are provided.

In one embodiment, a multiport assembly includes a shell extending between a front end and a rear end positioned opposite the front end in a longitudinal direction, the shell defining a cavity bounded by the shell, a plurality of apertures extending through the shell to the cavity, each aperture defining a tool insertion path extending inward from the plurality of apertures into the cavity, and a plurality of optical connector ports positioned at the front end of the shell and defining connector insertion paths extending inward from the plurality of optical connector ports into the cavity of the shell, where each aperture of the plurality of apertures is associated with a respective connector insertion path, a plurality of optical adapter assemblies positioned within the cavity of the shell, the plurality of optical adapter assemblies structurally configured to receive, align, and optically couple one or more input optical connectors to one or more output optical connectors, and a plurality of sealing piston securing members associated with respective ones of the connector insertion paths, each sealing piston securing member of the plurality of sealing piston securing members including a button portion and a securing portion positioned below the button portion, where each of the sealing piston securing members is repositionable between an engaged position, in which at least a portion of the securing portion intersects the connector insertion path, and a disengaged position, in which the securing portion is spaced apart from the connector insertion path, and where a width of the button portion of each of the sealing piston securing members is greater than width defined by each of the plurality of apertures.

In another embodiment, a multiport assembly kit includes a multiport assembly including a shell extending between a front end and a rear end positioned opposite the front end in a longitudinal direction, the shell defining a cavity bounded by the shell, a plurality of apertures extending through the shell to the cavity, each aperture defining a tool insertion path extending inward from the plurality of apertures into the cavity, and a plurality of optical connector ports positioned at the front end of the shell and defining connector insertion paths extending inward from the plurality of optical connector ports into the cavity of the shell, where each aperture of the plurality of apertures is associated with a respective connector insertion path, a plurality of optical adapter assemblies positioned within the cavity of the shell, the plurality of optical adapter assemblies structurally configured to receive, align, and optically couple one or more input optical connectors to one or more output optical connectors, and a plurality of sealing piston securing members associated with respective ones of the connector insertion paths, each sealing piston securing member of the plurality of sealing piston securing members including a button portion and a securing portion positioned below the button portion, where each of the sealing piston securing members is repositionable between an engaged position, in which at least a portion of the securing portion intersects the connector insertion path, and a disengaged position, in which the securing portion is spaced apart from the connector insertion path, and where a width of the button portion of each of the sealing piston securing members is greater than width defined by each of the plurality of apertures, and a release tool sized to be insertable into apertures of the plurality of apertures to engage the button portion of each of the sealing piston securing members.

In yet another embodiment, a method for selectively disconnecting a fiber optic connector from a multiport assembly includes inserting a release tool into an aperture of a multiport assembly to depress a sealing piston securing member positioned within a cavity of the multiport assembly and engaged with an optical connector, moving the sealing piston securing member away from a connector insertion path defined by the multiport assembly with the release tool, disengaging the sealing piston securing member from the fiber optic connector, and removing the fiber optic connector from the multiport assembly through optical connector port of the multiport assembly.

Although the concepts of the present disclosure are described herein with reference to a set of drawings that show a particular type of fiber optic cable, and connector components of particular size and shape, it is contemplated that the concepts may be employed in any optical fiber connectorization scheme including, for example, and without limitation, hardened OptiTap® and OptiTip® connectors, field-installable UniCam® connectors, single or multi-fiber cable assemblies with SC, FC, LC, or multi-fiber connectors, etc.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Embodiments described herein generally relate to various devices for forming an optical connection between optical fibers. More particularly, embodiments described herein relate to multiport assemblies including a plurality of optical adapter assemblies structurally configured to receive, align, and optically couple one or more input optical connectors to one or more output optical connectors. Optical connectors may be selectively inserted within the multiport assembly to engage the plurality of optical adapter assemblies, and may be selectively retained within the multiport assembly by sealing piston securing members. The sealing piston securing members may also selectively release the optical connectors such that the optical connectors may be disengaged from the optical adapters. However, inadvertent or unauthorized manipulation of the sealing piston securing members may release the optical connectors from the multiport assembly, which may result in signal disruption.

Embodiments described herein restrict access to the sealing piston securing members through apertures defined by a shell of the multiport assembly. In embodiments, a width of each of the apertures is selected to be less than a width of a human finger, such that the plurality of sealing piston securing members may not generally be accessed by a user without the use of a release tool that is sized to be inserted within the apertures. In this way, inadvertent or unauthorized manipulation of the sealing piston securing members and selective release of the plurality of optical connectors from the multiport assembly may be minimized. These and other embodiments will now be described with specific reference to the appended drawings.

As used herein, the term "longitudinal direction" refers to the forward-rearward direction of components of the multiport assembly (i.e., in the +/− Z-direction as depicted). The term "lateral direction" refers to the cross-direction of components of the multiport assembly (i.e., in the +/− X-direction as depicted), and is transverse to the longitudinal direction. The term "vertical direction" refers to the upward-downward direction of the components of the multiport assembly (i.e., in the +/− Y-direction as depicted), and is transverse to the lateral and the longitudinal directions.

Figure 1:
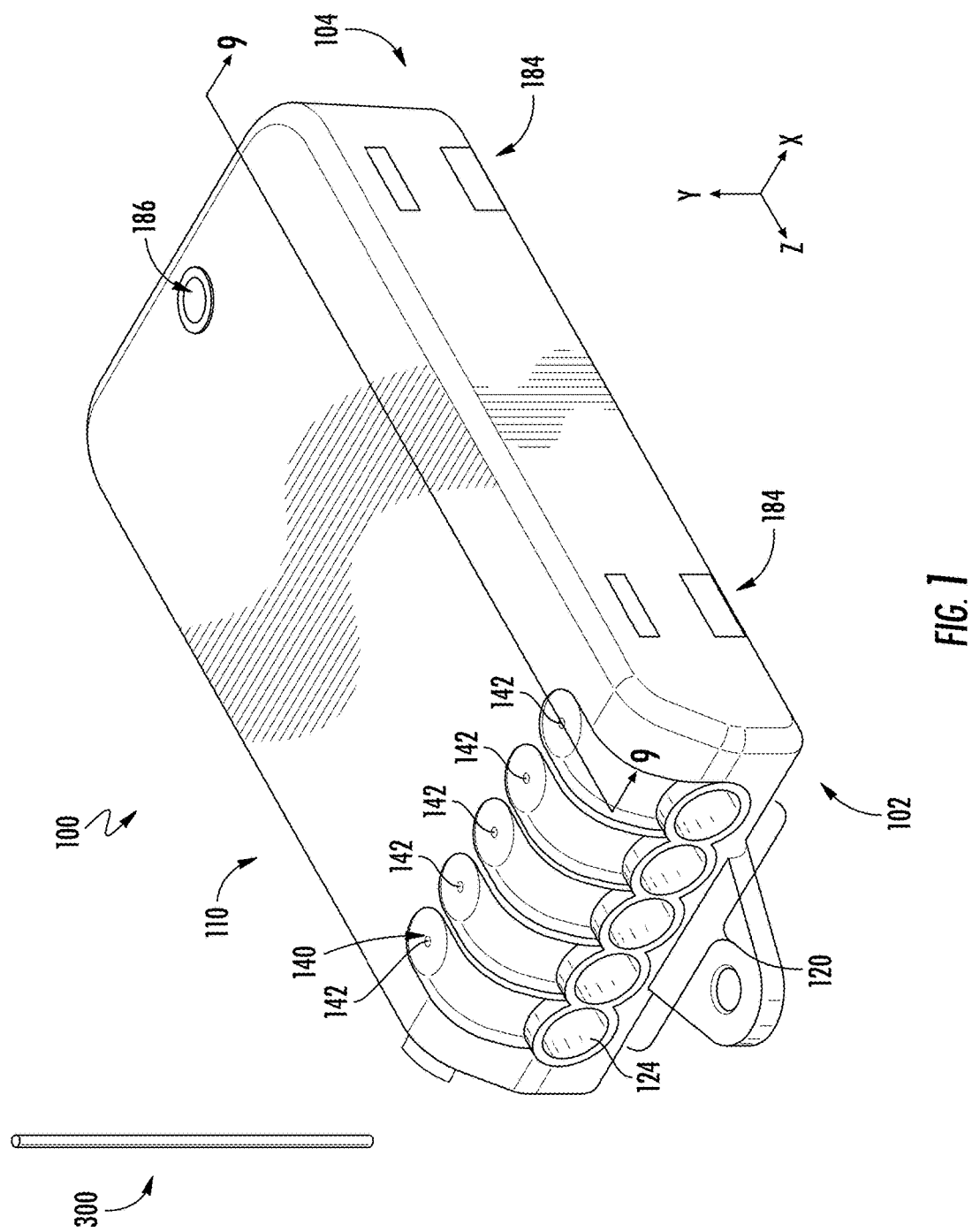
FIG. 1 schematically depicts a perspective view of a multiport assembly, according to one or more embodiments shown and described herein.

Referring initially to FIG. 1, a perspective view of a multiport assembly 100 is schematically depicted. The multiport assembly 100 generally includes a shell 110 that extends between a front end 102 and a rear end 104 in the longitudinal direction and that defines a plurality of optical connector ports 120 positioned at the front end 102 of the multiport assembly 100. A plurality of optical connectors may be inserted within the plurality of optical connector ports 120, as described in greater detail herein. In some embodiments, the shell 110 defines an input connector port 124 positioned at the front end 102 of the multiport assembly 100. An input connector, such as an input tether may be inserted within the input connector port 124, as described in greater detail herein.

In embodiments, the shell 110 defines a plurality of apertures 140 extending through the shell 110 to a cavity bounded by the shell 110. A release tool 300 may be insertable within the apertures 140 to selectively disconnect optical connectors from the multiport assembly 100, as described in greater detail herein.

The shell 110 may also define one or more perimeter through slots 184 that extend through the shell 110 in the vertical direction and that may receive a band or belt to fasten the multiport assembly 100 to a post or utility pole. In some embodiments, the shell 110 further includes a bushing 186 extending through the shell 110. A mechanical fastener, such as a screw or the like may be passed through the bushing 186 to fasten the multiport assembly 100 to an object, such as a utility pole or the like, and the bushing 186 may resist forces applied to the shell 110 by the mechanical fastener.

Figure 2:
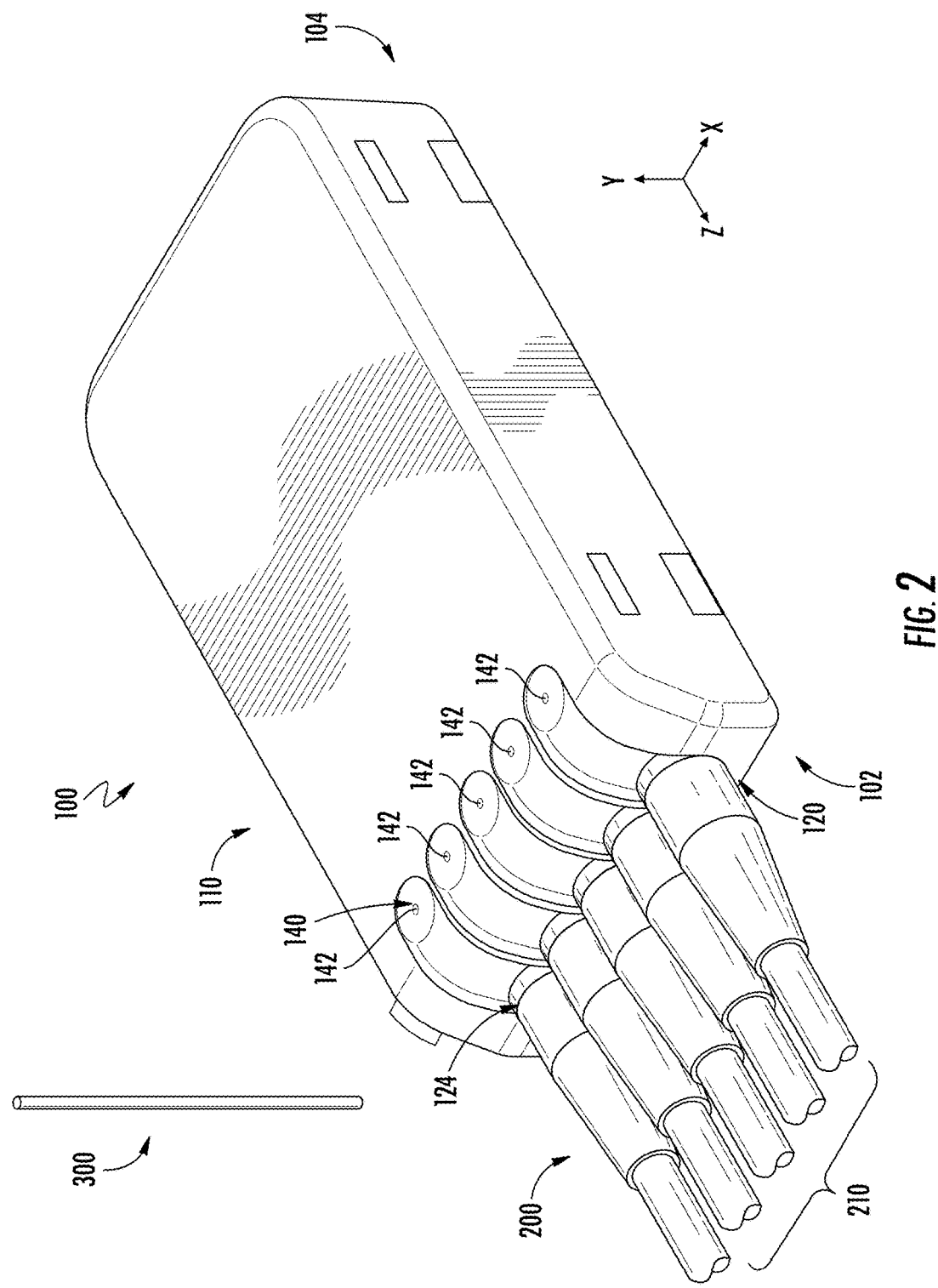
FIG. 2 schematically depicts a perspective view of the multiport assembly of FIG. 1 with a plurality of optical connectors and an input tether inserted within a plurality of optical connector ports of the multiport assembly, according to one or more embodiments shown and described herein.

Referring to FIG. 2, a perspective view of the multiport assembly 100 is depicted with a plurality of optical connectors 210 inserted within corresponding optical connector ports of the plurality of optical connector ports 120. In the embodiment depicted in FIG. 2, an input tether 200 is inserted within the input connector port 124. While in the embodiment depicted in FIG. 2, the input connector port 124 is positioned at the front end 102 of the multiport assembly 100, it should be understood that the input connector port 124 may be positioned at any suitable location on the multiport assembly 100, for example at the rear end 104 of the multiport assembly 100 or at a position between the front end 102 and the rear end 104 of the multiport assembly 100.

Figure 3:
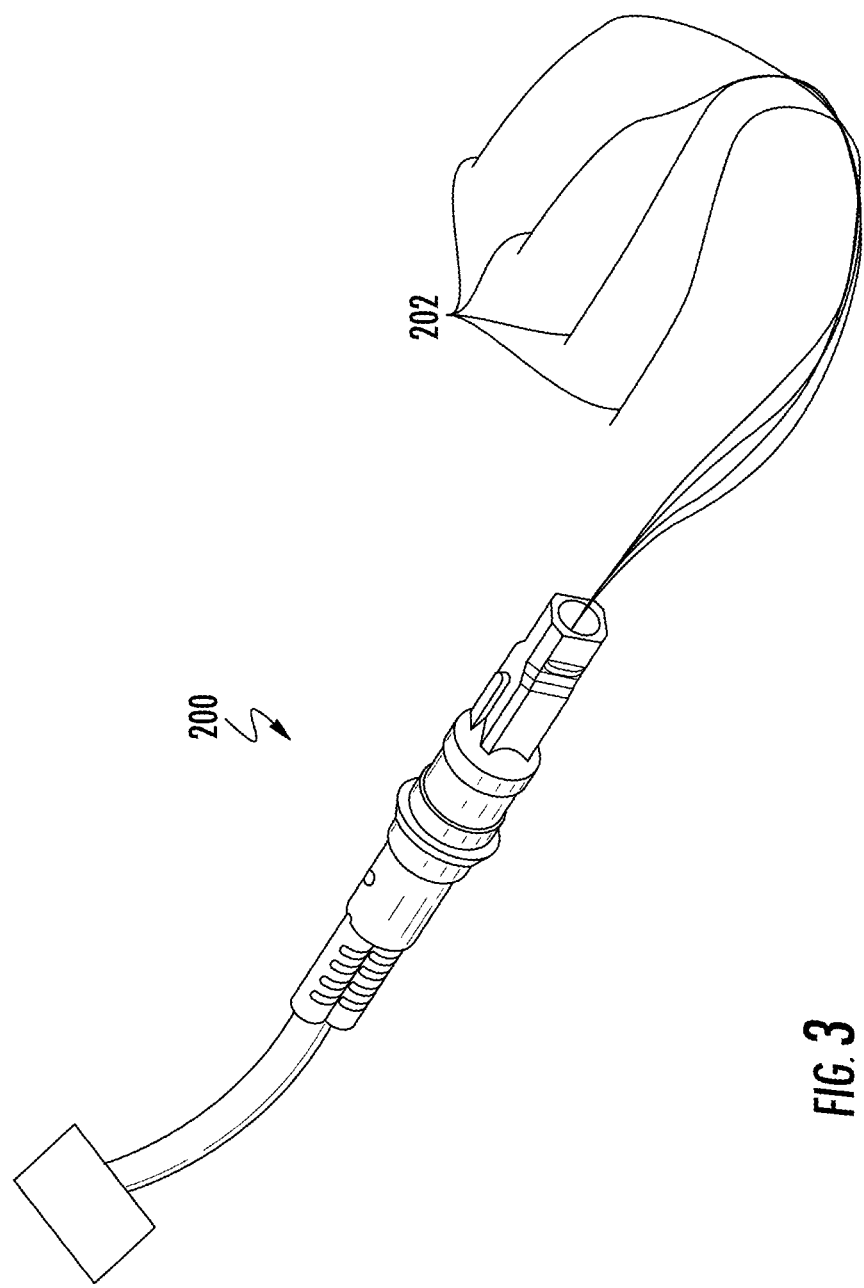
FIG. 3 schematically depicts the input tether of FIG. 2 in isolation, according to one or more embodiments shown and described herein.

Referring to FIG. 3, the input tether 200 is depicted in isolation. The input tether 200 may generally include a plurality of optical fibers 202 therein, which may be terminated within the multiport assembly 100 (FIG. 2), for example at corresponding optical adapter assemblies, as described in greater detail herein. In some embodiments, the input tether 200 may include a furcation body that generally includes a portion of the input tether 200 that transitions to the individual optical fibers 202 for routing within a cavity of the shell 110 to facilitate connection to corresponding optical adapter assemblies. In some embodiments, the input tether 200 may terminate with a fiber optic connector or be a stubbed cable as desired. For instance, the input tether 200 could be an OptiTip® connector for optical connection to previously installed distribution cables; however, other suitable single-fiber or multi-fiber connectors may be used for terminating the input tether 200 as desired. While the embodiment depicted in FIG. 2 depicts an input tether 200 including a plurality of optical fibers 202, it should be understood that in other embodiments, the input tether 200 may include a single optical fiber, as described in greater detail herein.

Referring to FIG. 3, an exploded perspective view of the multiport assembly 100 is depicted. The shell 110 generally includes an upper shell member 114 coupled to a lower shell member 116, the upper shell member 114 and the lower shell member 116 defining a cavity 112 positioned within and bounded by the shell 110. In embodiments, the upper shell member 114 and the lower shell member 116 may be formed from any suitable material, such as a polymer, a composite, a resin, or the like, and may be formed through any suitable process, such as and without limitation, molding or the like. The shell 110 of the multiport assembly 100 may optionally be weatherproofed by appropriately sealing the upper shell member 114 to the lower shell member 116. The optical connector ports 120 and the input connector port 124 may also be sealed with the plurality of optical connectors 210 and the input tether 200, respectively, using any suitable means such as gaskets, O-rings, adhesive, sealant, welding, overmolding or the like. If the multiport assembly 100 is intended for indoor applications, then the weatherproofing may not be required.

In one embodiment, to seal the upper shell member 114 and the lower shell member 116 together, a heat soluble resin may be utilized. The heat soluble resin can be in the form of a thermoplastic cord containing magnetically active particles. For example, the heat soluble resin can be placed in a groove defined by the upper shell member 114 and/or the lower shell member 116, and the upper shell member 114 and the lower shell member 116 may be pressed toward each other. An induced energy may then be applied to heat the heat soluble material (also referred to herein as a resin) causing the heat soluble material to soften and then re-harden after cooling, thereby making a strong seal at the housing interface. Typically, the strength seal (e.g., the cord of thermoplastic) extends entirely around a perimeter of the upper shell member 114 and the lower shell member 116; however, in some applications the cord does not extend entirely around the perimeter. The resin can include magnetically active particles and the induced energy can be a radio frequency (RF) electromagnetic field which induces eddy currents in the magnetically active pieces. The eddy currents flowing in the magnetically active particles heat the magnetically active particles which cause the heat soluble material to soften and bond with the upper shell member 114 and the lower shell member 116. The RF field is then turned off, and when the heat soluble material cools off, the heat soluble material hardens, and thus, the upper shell member 114 and the lower shell member 116 are welded together. One exemplary process employs EMABOND™, commercially available from the Ashland Specialty Chemical company of Ohio as the heat soluble material with embedded magnetically active particles.

Figure 4:
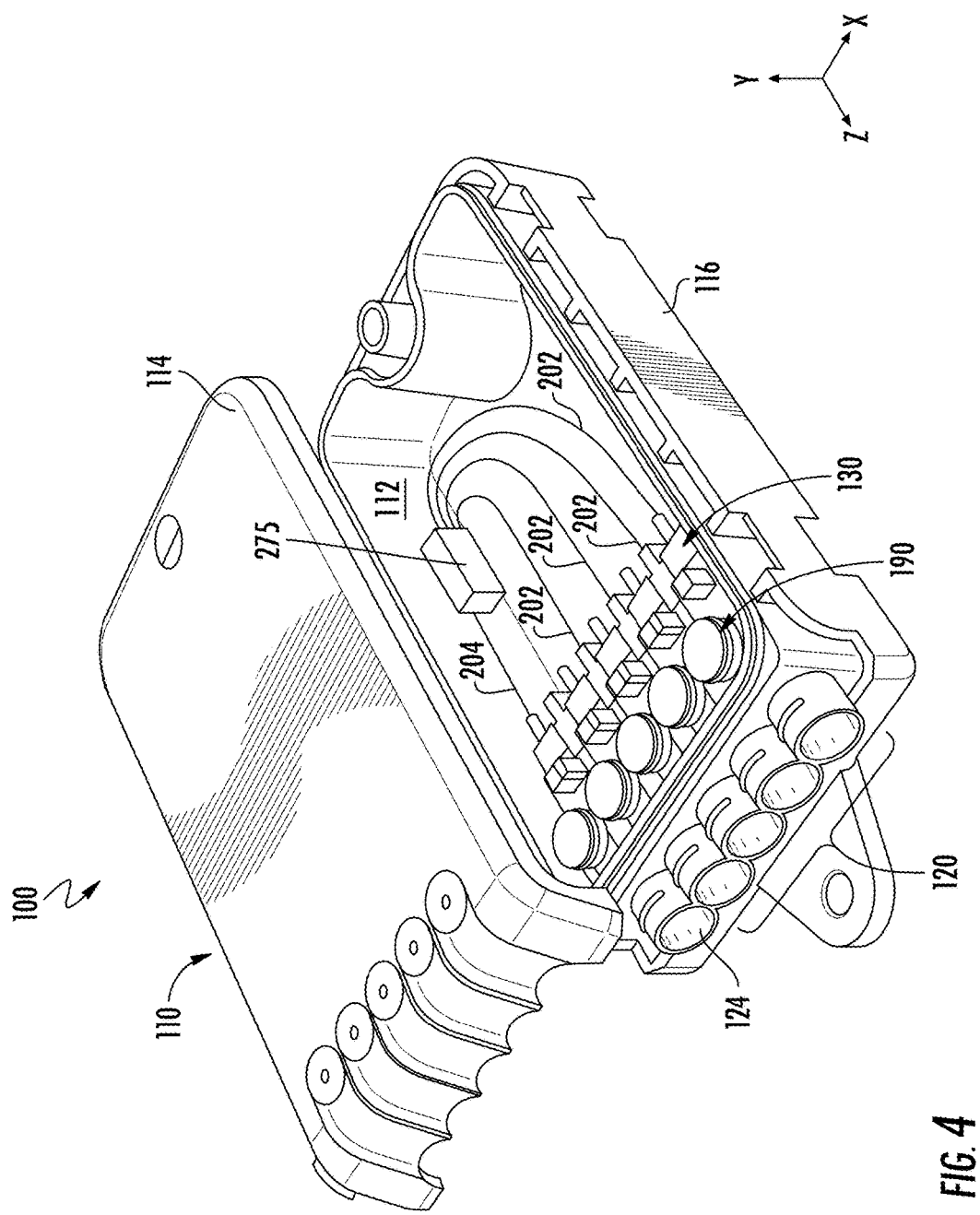
FIG. 4 schematically depicts an exploded view of the multiport assembly of FIG. 1, according to one or more embodiments shown and described herein.

Still referring to FIG. 4, in some embodiments, an optical splitter 275 may be positioned within the cavity 112, and may split a signal from a single optical fiber 204 into a plurality of optical fibers 202. In particular, the optical splitter 275 may receive a single optical fiber 204, for example from an input tether 200 (FIG. 3), and may split a signal from the optical fiber 204 into a plurality of optical fibers 202 that extend between the optical splitter 275 and a plurality of optical adapter assemblies 130. In one example, the optical splitter 275 allows a single optical signal to be split into multiple signals such as 1×N split, but other splitter arrangements are possible such as a 2×N split. In the embodiment depicted in FIG. 4, a signal from the single optical fiber 204 is split by the optical splitter 275 to four optical fibers 202.

The multiport assembly 100 further includes a plurality of sealing piston securing members 190 associated with each of the optical connector ports 120 and the input connector port 124. The plurality of sealing piston securing members 190 are structurally configured to engage the input tether 200 (FIG. 2) and/or the plurality of optical connectors 210 (FIG. 2) and retain at least a portion of the input tether 200 and/or the plurality of optical connectors 210 within the cavity 112 of the multiport assembly 100. In embodiments, the plurality of sealing piston securing members 190 selectively retain the plurality of optical connectors 210 (FIG. 2) and/or the input tether 200 (FIG. 2) within the cavity 112 of the multiport assembly 100, such that the plurality of optical connectors 210 and/or the input tether 200 may be selectively removable from the multiport assembly 100. In some embodiments, the input tether 200 (FIG. 2) and the plurality of optical connectors 210 (FIG. 2) are each selectively retained within the cavity 112 of the multiport assembly 100 by the plurality of sealing piston securing members 190. In other embodiments, the plurality of optical connectors 210 (FIG. 2) may be selectively retained within the cavity 112 of the multiport assembly 100 by the plurality of sealing piston securing members 190, while the input tether 200 is rigidly connected to the multiport assembly 100 (i.e., the input tether 200 is not generally removable from the multiport assembly 100 without dis-assembling the multiport assembly 100). In other embodiments, the input tether 200 (FIG. 2) and/or the optical connectors 210 (FIG. 2) may be secured to the multiport assembly 100 in other suitable manners such as adhesive, a collar or crimp, heat shrink or combinations of the same.

The multiport assembly 100 further includes the plurality of optical adapter assemblies 130 positioned within the cavity 112 of the shell 110. As described in greater detail herein, the plurality of optical adapter assemblies 130 are structurally configured to receive, align, and optically couple one or more input optical connectors to one or more output optical connectors. In embodiments each of the plurality of optical adapter assemblies 130 are aligned with a corresponding optical connector port of the plurality of optical connector ports 120 and/or with the input connector port 124.

Figure 5:
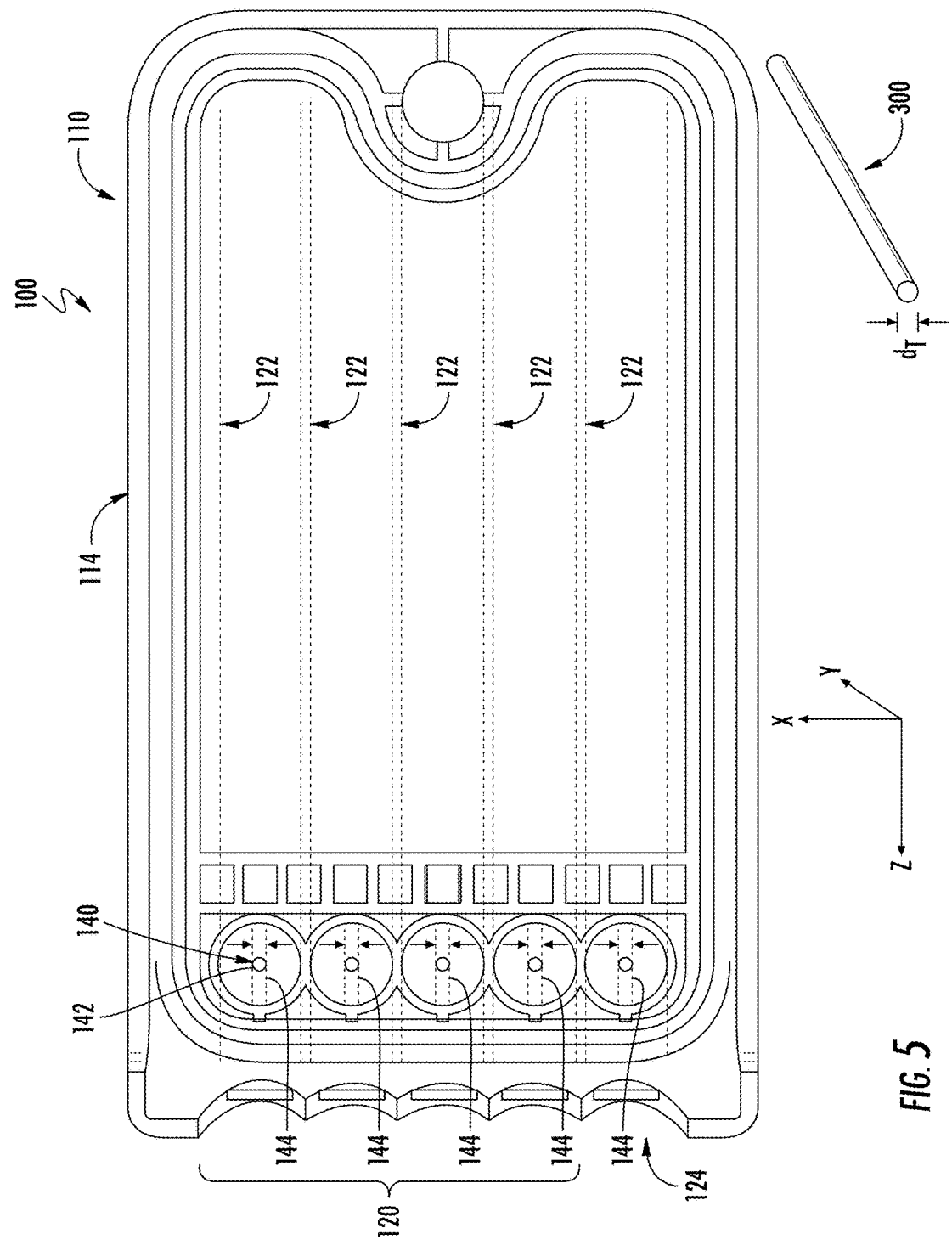
FIG. 5 schematically depicts a perspective view of an upper shell member of the multiport assembly of FIG. 1, according to one or more embodiments shown and described herein.

Referring to FIG. 5, a perspective view of the upper shell member 114 is schematically depicted. In embodiments, the upper shell member 114 defines at least a portion of the plurality of optical connector ports 120 and/or the input connector port 124. In some embodiments, the plurality of optical connector ports 120 and/or the input connector port 124 may be defined entirely on the upper shell member 114 or entirely on the lower shell member 116 (FIG. 4). Each of the plurality of optical connector ports 120 and the input connector port 124 define a connector insertion path 122 through which the optical connectors 210 (FIG. 2) and/or the input tether 200 (FIG. 2) may be inserted, permitting the optical connectors 210 to access the plurality of optical adapter assemblies 130 (FIG. 4). The plurality of sealing piston securing members 190 (FIG. 4) selectively interrupt the connector insertion paths 122 to secure the optical connectors 210 (FIG. 2) and/or the input tether 200 (FIG. 2), as described in greater detail herein.

In embodiments, the upper shell member 114 defines the plurality of apertures 140 extending through the shell 110, through which the plurality of sealing piston securing members 190 (FIG. 4) may be accessed. For example, at least a portion of the plurality of sealing piston securing members 190 (FIG. 4) may be accessed through the plurality of apertures 140, such that a user may reposition the plurality of sealing piston securing members 190 between an engaged position, in which the plurality of sealing piston securing members 190 may retain the input tether 200 (FIG. 2) and/or the plurality of optical connectors 210 (FIG. 2) within the multiport assembly 100, and a disengaged position, in which the input tether 200 and/or the plurality of optical connectors 210 may be removable from the multiport assembly 100.

In the embodiment depicted in FIG. 5, the plurality of apertures 140 are positioned on a different surface of the upper shell member 114 than the input connector port 124 and the plurality of optical connector ports 120. In other embodiments, the input connector port 124 and the plurality of optical connector ports 120 are positioned on the same surface of the upper shell member 114 as the plurality of apertures 140. Each aperture 142 of the plurality of apertures is associated with a respective connector insertion path 122, and each aperture 142 defines a tool insertion path 144 that extends inward from the plurality of apertures 140 to the cavity 112 (FIG. 4) of the shell 110. In some embodiments, each of the tool insertion paths 144 is transverse to and intersects a respective connector insertion path 122. In other embodiments, for example in embodiments in which the plurality of optical connector ports 120 and the plurality of apertures 140 are positioned on the same surface of the upper shell member 114, the tool insertion paths 144 may be aligned with and may not intersect a respective connector insertion path 122.

In operation, the release tool 300 may be inserted into the individual apertures 142 along the tool insertion paths 144 to engage ones of the plurality of sealing piston securing members 190 (FIG. 4) and move the sealing piston securing members 190 from the engaged position to the disengaged position. In embodiments, each of the individual apertures 142 define a width that corresponds to a width of the release tool 300, such that the release tool 300 may be inserted through the apertures 142. For example, in the embodiment depicted in FIG. 5, the release tool 300 defines a cylindrical shape and the apertures 142 are generally circular, and the release tool 300 defines a diameter dT that corresponds to a diameter dA of each of the apertures 142.

In some embodiments, the diameter dT of the release tool 300 and the diameter dA of each of the apertures 142 is selected to be less than a width of a human finger, such that the plurality of sealing piston securing members 190 (FIG. 4) may not generally be accessed by a user without the release tool 300. In this way, inadvertent or unauthorized manipulation of the sealing piston securing members 190 (FIG. 4) and selective release of the plurality of optical connectors 210 (FIG. 2) and/or the input tether 200 (FIG. 2) from the multiport assembly 100 may be minimized. Inadvertent or unauthorized release of the plurality of optical connectors 210 (FIG. 2) and/or the input tether 200 (FIG. 2) from the multiport assembly 100 may result in signal disconnection and may require time-consuming troubleshooting to identify the source of the disconnection, which may result in end-user dissatisfaction. However, by restricting access such that a user generally cannot access the sealing piston securing members 190 (FIG. 4) without the release tool 300, inadvertent or unauthorized release of the plurality of optical connectors 210 (FIG. 2) and/or the input tether 200 (FIG. 2) from the multiport assembly 100 may be minimized. In some embodiments, the diameter dT of the release tool 300 and the diameter dA of each of the apertures 142 is less than about 5 millimeters.

In other embodiments, the release tool 300 and the apertures 142 may include other complementary shapes, for example the release tool 300 may include a rectangular prism and the apertures 142 may define rectangular shapes. Regardless of the shape of the release tool 300 and the apertures 142, an outer perimeter of the release tool 300 is generally selected to correspond to an inner perimeter of the apertures 142, such that the release tool 300 is insertable through the apertures 142.

Figure 6:
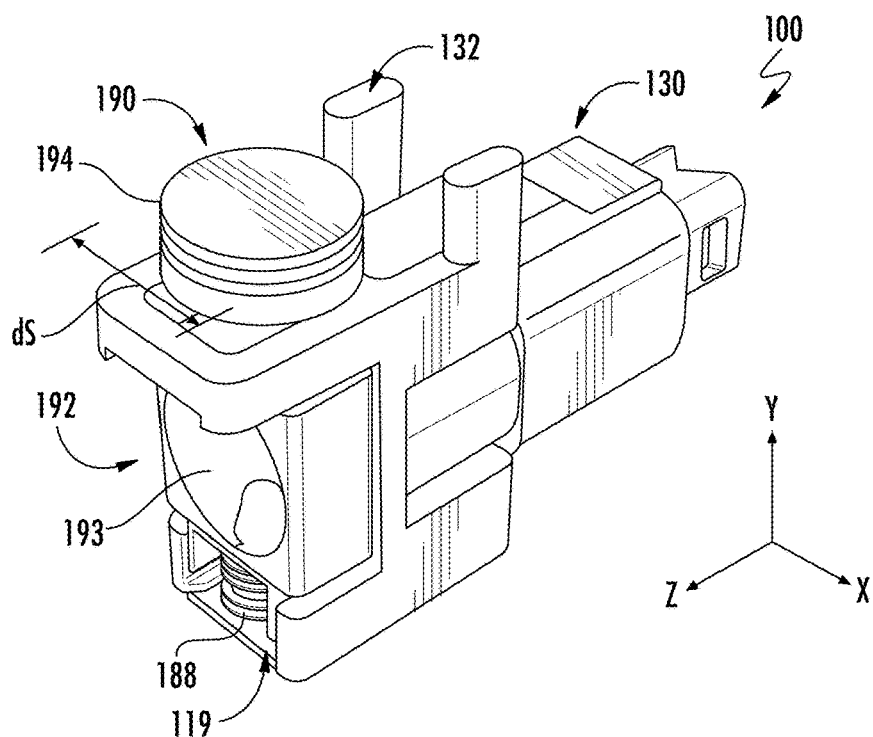
FIG. 6 schematically depicts an perspective view of a sealing piston securing member of the multiport assembly of FIG. 1, according to one or more embodiments shown and described herein.
Figure 7:
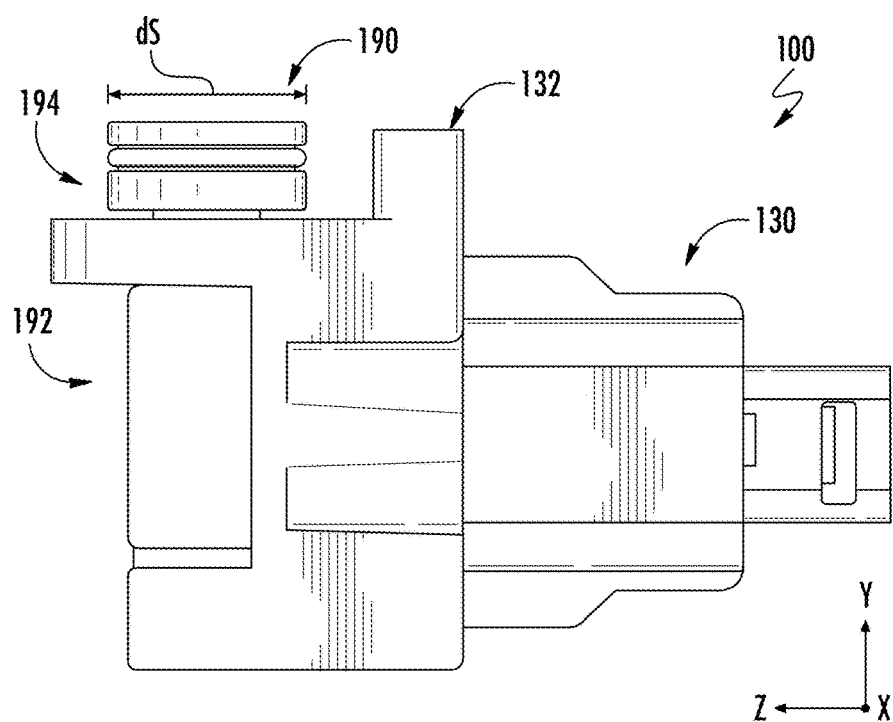
FIG. 7 schematically depicts an side view of the sealing piston securing member of FIG. 6, according to one or more embodiments shown and described herein.
Figure 8:
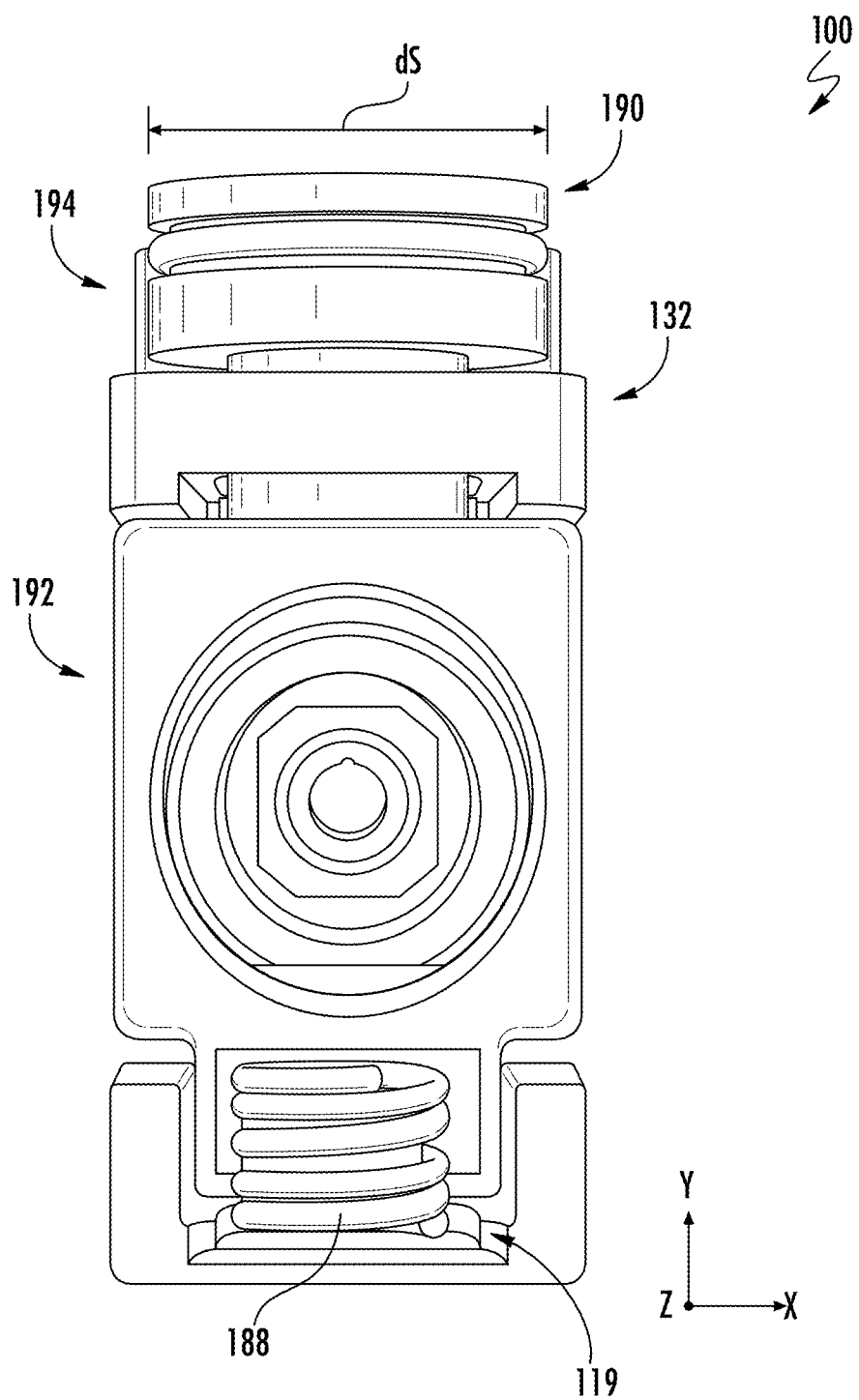
FIG. 8 schematically depicts a front view of the sealing piston securing member of FIG. 6, according to one or more embodiments shown and described herein.

Referring collectively to FIGS. 6, 7, and 8, a perspective view, a side view, and a front view of one of the plurality of sealing piston securing members 190 and one of the plurality of optical adapter assemblies 130 is schematically depicted. Each sealing piston securing member of the plurality of sealing piston securing members 190 corresponds to and is generally aligned with a respective optical adapter assembly of the plurality of optical adapter assemblies 130. In embodiments, each sealing piston securing member of the plurality of sealing piston securing members 190 and each of the optical adapter assembly of the plurality of optical adapter assemblies 130 are mounted to a module member 132. The module members 132 may generally "float" within the cavity 112 (FIG. 4) of the shell 110 (FIG. 4), such that each of the optical adapter assemblies of the plurality of optical adapter assemblies 130 and each of the sealing piston securing members of the plurality of sealing piston securing members 190 may have some freedom of movement in the lateral, the longitudinal, and/or the vertical directions within the cavity 112 (FIG. 4) of the shell 110. Allowing some freedom of movement of individual optical adapter assemblies of the plurality of optical adapter assemblies 130 may assist in aligning optical fibers of the plurality of optical connectors 210 (FIG. 2) with corresponding optical fibers positioned within the plurality of optical adapter assemblies 130.

In embodiments, the multiport assembly 100 includes securing member biasing members 188 that are each engaged with a corresponding sealing piston securing member of the plurality of sealing piston securing members 190. The securing member biasing members 188 are positioned within the securing member recess 119 of the module member 132, and in some embodiments, each of the securing member recess 119 include a post that engages and retains a corresponding securing member biasing member 188. Each of the securing member biasing members 188 may bias a corresponding sealing piston securing member 190 upward in the vertical direction and into the engaged position. A user may depress the securing portion 192 downward in the vertical direction (i.e., with the release tool 300 as shown in FIG. 5) to overcome the bias of the securing member biasing member 188 and reposition the sealing piston securing member 190 into the disengaged position. The securing member biasing member 188 may include any suitable biasing member, for example and without limitation, a compression spring, a tension spring, a torsion spring, or the like.

Each sealing piston securing member 190 generally includes a button portion 194 and a securing portion 192 that is positioned below the button portion 194 and that defines a bore 193 extending through the securing portion 192. In some embodiments, the button portion 194 and the securing portion 192 are monolithically formed. In other embodiments, the button portion 194 and the securing portion 192 are coupled to and/or engaged with one another. In embodiments, at least a portion of the input tether 200 (FIG. 2) or an optical connector 210 (FIG. 2) may be inserted within the bore 193 as the input tether 200 or the optical connector 210 is inserted within the multiport assembly 100. Each of the sealing piston securing members 190 may include one or more retention features configured to engage the input tether 200 (FIG. 2) or the optical connector 210 (FIG. 2) and retain the input tether 200 or the optical connector 210 within the multiport assembly 100.

In embodiments, the button portion 194 generally defines a width extending across the button portion 194 that is greater than a width of the apertures 142 (FIG. 5). Because the button portion 194 generally defines a width that is that is greater than a width of the apertures 142 (FIG. 5), the upper shell member 114 (FIG. 5) may generally constrain the plurality of sealing piston securing members 190 within the multiport assembly 100. In the embodiment depicted in FIGS. 6, 7, and 8, the button portion 194 includes a generally cylindrical shape defining a diameter dS, which in embodiments, is greater than about 50 millimeters. In other embodiments, the button portion 194 may include any suitable shape having a width that is greater than the width of the apertures 142 (FIG. 5), such as a rectangular prism or the like.

Figure 9:
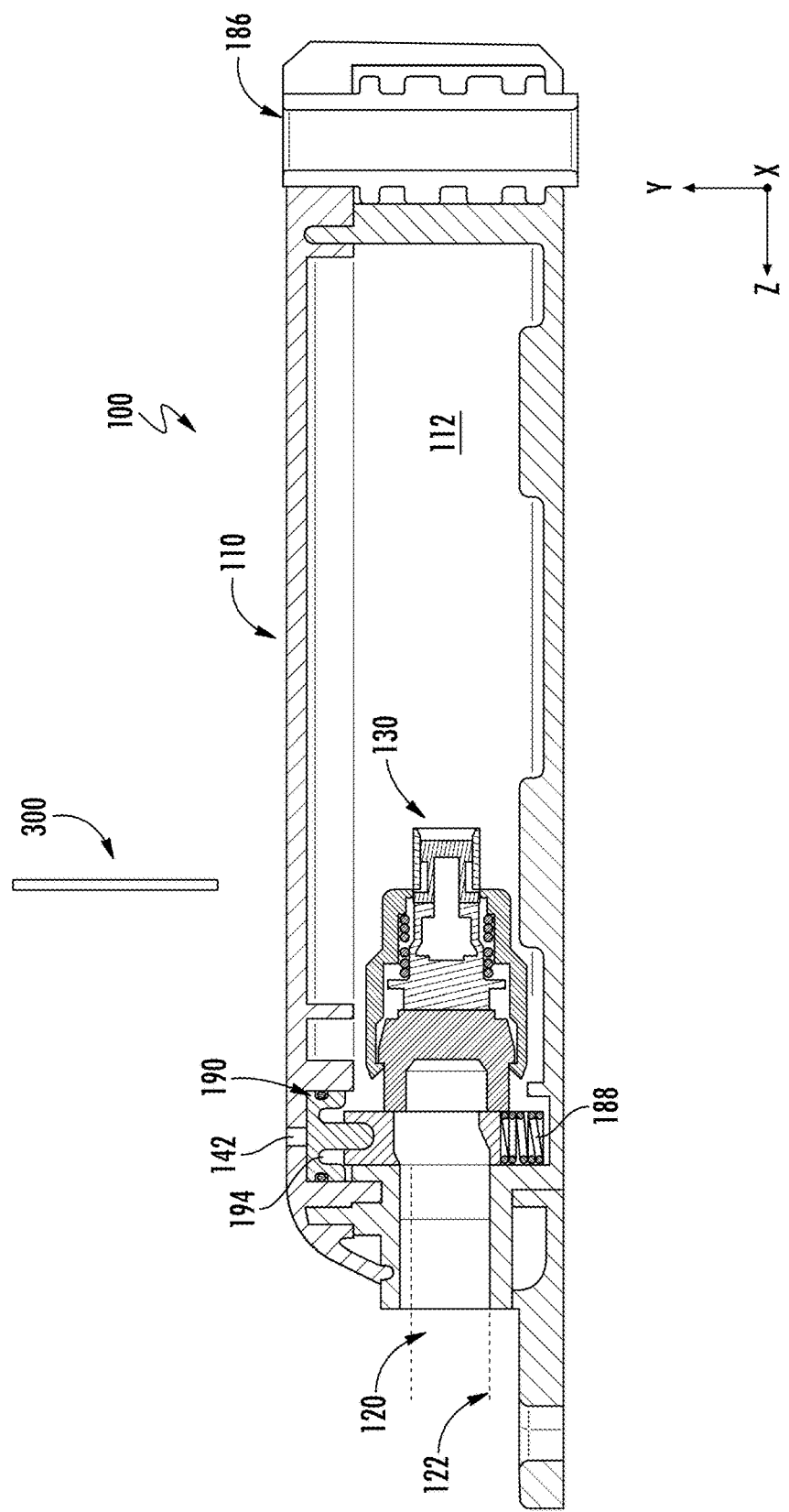
FIG. 9 schematically depicts a section view of the multiport assembly along section 9-9 of FIG. 1, according to one or more embodiments shown and described herein.

Referring to FIG. 9, a section view of the multiport assembly 100 is depicted along section 9-9 of FIG. 1. Each of the connector insertion paths 122 are generally aligned with a corresponding optical adapter assembly 130, such that optical fibers of optical connectors 210 (FIG. 2) inserted into the multiport assembly 100 along a connector insertion path 122 may be aligned with a corresponding optical adapter assembly 130. In embodiments, each of the optical adapter assemblies 130 are structurally configured to receive, align, and optically couple one or more input optical connectors to one or more output optical connectors. For example, the optical adapter assemblies 130 are configured to receive an optical connector 210 (FIG. 2) on one side, and optically couple the optical connector 210 (FIG. 2) to another optical fiber engaged with and/or optically coupled to the optical adapter assembly 130, such as an optical fiber 202 (FIG. 3) of the input tether 200 (FIG. 3) that is optically coupled to the other side of the optical adapter assembly 130.

As depicted, sealing piston securing members 190 are positioned within the shell 110 and intersect the connector insertion paths 122. In particular, each of the sealing piston securing members 190 are repositionable with respect to the shell 110 in the vertical direction between an engaged position, in which at least a portion of the sealing piston securing members 190 are positioned within and intersects a corresponding connector insertion path 122, and a disengaged position, in which the sealing piston securing members 190 is spaced apart from the connector insertion path 122. By moving each of the sealing piston securing members 190 in and out of a corresponding connector insertion path 122, the sealing piston securing members 190 may selectively engage the input tether 200 (FIG. 2) and the optical connectors 210 (FIG. 2) and retain the input tether 200 and the optical connectors 210 within the shell 110.

Each of the apertures 142 are aligned with and correspond to one of the plurality of sealing piston securing members 190, such that the release tool 300 may be inserted within the apertures 142 to move the sealing piston securing members 190 between the engaged position and the disengaged position. For example, to disconnect one of the optical connectors 210 (FIG. 2) from the multiport assembly 100, the release tool 300 may be inserted into the aperture 142 to depress an associated sealing piston securing member 190 within the cavity 112 of the shell 110. With the release tool 300, the sealing piston securing member 190 is moved downward and away from the connector insertion path 122, disengaging the optical connector 210 (FIG. 2) from the sealing piston securing member 190, such that the optical connector 210 may be removed from the multiport assembly 100.

Accordingly, it should now be understood that multiport assemblies of the present disclosure generally include various devices for forming an optical connection between optical fibers. More particularly, embodiments described herein relate to multiport assemblies including a plurality of optical adapter assemblies structurally configured to receive, align, and optically couple one or more input optical connectors to one or more output optical connectors. Optical connectors may be selectively inserted within the multiport assembly to engage the plurality of optical adapter assemblies, and may be selectively retained within the multiport assembly by sealing piston securing members. The sealing piston securing members may also selectively release the optical connectors such that the optical connectors may be disengaged from the optical adapters. However, inadvertent or unauthorized manipulation of the sealing piston securing members may release the optical connectors from the multiport assembly, which may result in signal disruption.

Embodiments described herein restrict access to the sealing piston securing members through apertures defined by a shell of the multiport assembly. In embodiments, a width of each of the apertures is selected to be less than a width of a human finger, such that the plurality of sealing piston securing members may not generally be accessed by a user without the use of a release tool that is sized to be inserted within the apertures. In this way, inadvertent or unauthorized manipulation of the sealing piston securing members and selective release of the plurality of optical connectors from the multiport assembly may be minimized.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A multiport assembly comprising:
   a shell extending between a front end and a rear end positioned opposite the front end, the shell defining:
      a cavity bounded by the shell;
      a plurality of apertures extending through the shell to the cavity, each aperture defining a tool insertion path extending inward from the plurality of apertures into the cavity; and
      a plurality of optical connector ports positioned at the front end of the shell and each defining a respective connector insertion path extending inward from the plurality of optical connector ports into the cavity of the shell;
   a plurality of optical adapter assemblies positioned within the cavity of the shell, the plurality of optical adapter assemblies structurally configured to optically couple one or more input optical connectors to one or more output optical connectors; and
   a plurality of sealing piston securing members associated with respective ones of the connector insertion paths, each sealing piston securing member of the plurality of sealing piston securing members comprising a button portion and a securing portion positioned below the button portion, wherein each of the sealing piston securing members is repositionable between an engaged position, in which at least a portion of the securing portion intersects the connector insertion path, and a disengaged position, in which the securing portion is spaced apart from the connector insertion path, and wherein a width of the button portion of each of the sealing piston securing members is greater than width defined by each of the plurality of apertures.

2. The multiport assembly of claim 1, wherein each tool insertion path is transverse to a respective connector insertion path.

3. The multiport assembly of claim 1, wherein the width defined by each of the plurality of apertures is less than 5 millimeters.

4. The multiport assembly of claim 1, wherein the width of the button portion of each of the sealing piston securing members is greater than 50 millimeters.

5. The multiport assembly of claim 1, further comprising a plurality of securing member biasing members each engaged with a corresponding sealing piston securing member of the plurality of sealing piston securing members, wherein the plurality of securing member biasing members each bias the corresponding sealing piston securing member into the engaged position.

6. The multiport assembly of claim 1, wherein each of the plurality of sealing piston securing members comprise a bore extending through the sealing piston securing member.

7. The multiport assembly of claim 1, further comprising a splitter positioned within the cavity of the shell and a plurality of optical fibers extending between the splitter and the plurality of optical adapter assemblies.

8. The multiport assembly of claim 1, further comprising an input tether comprising a plurality of optical fibers connected with corresponding optical adapter assemblies of the plurality of optical adapter assemblies.

9. A multiport assembly kit comprising:
   a multiport assembly comprising:
      a shell extending between a front end and a rear end positioned opposite the front end, the shell defining:
         a cavity bounded by the shell;
         a plurality of apertures extending through the shell to the cavity, each aperture defining a tool insertion path extending inward from the plurality of apertures into the cavity; and
         a plurality of optical connector ports positioned at the front end of the shell and each defining a connector insertion path extending inward from the plurality of optical connector ports into the cavity of the shell, wherein each aperture of the plurality of apertures is associated with a respective connector insertion path;
      a plurality of optical adapter assemblies positioned within the cavity of the shell, the plurality of optical adapter assemblies structurally configured to optically couple one or more input optical connectors to one or more output optical connectors; and
      a plurality of sealing piston securing members associated with respective ones of the connector insertion paths, each sealing piston securing member of the plurality of sealing piston securing members comprising a button portion and a securing portion positioned below the button portion, wherein each of the sealing piston securing members is repositionable between an engaged position, in which at least a portion of the securing portion intersects the connector insertion path, and a disengaged position, in which the securing portion is spaced apart from the connector insertion path, and wherein a width of the button portion of each of the sealing piston securing members is greater than width defined by each of the plurality of apertures; and
   a release tool sized to be insertable into apertures of the plurality of apertures to engage the button portion of each of the sealing piston securing members.

10. The multiport assembly kit of claim 9, wherein each tool insertion path is transverse to a respective connector insertion path.

11. The multiport assembly kit of claim 9, wherein the width of the button portion of each of the plurality of sealing piston securing members is greater than a width of the release tool.

12. The multiport assembly kit of claim 9, wherein the release tool defines a width that is less than 5 millimeters.

13. The multiport assembly kit of claim 9, wherein the width defined by each of the plurality of apertures is less than 5 millimeters.

14. The multiport assembly kit of claim 9, wherein the width of the button portion of each of the sealing piston securing members is greater than 50 millimeters.

15. The multiport assembly kit of claim 9, further comprising a plurality of securing member biasing members each engaged with a corresponding sealing piston securing member of the plurality of sealing piston securing members, wherein the plurality of securing member biasing members each bias the corresponding sealing piston securing member into the engaged position.

16. The multiport assembly kit of claim 9, wherein each of the plurality of sealing piston securing members comprise a bore extending through the sealing piston securing member.

17. The multiport assembly kit of claim 9, further comprising a splitter positioned within the cavity of the shell and a plurality of optical fibers extending between the splitter and the plurality of optical adapter assemblies.

18. The multiport assembly kit of claim 9, further comprising an input tether comprising a plurality of optical fibers connected with corresponding optical adapter assemblies of the plurality of optical adapter assemblies.

19. A method for selectively disconnecting a fiber optic connector from a multiport assembly, the method comprising:

inserting a release tool into an aperture of a multiport assembly to depress a sealing piston securing member positioned within a cavity of the multiport assembly and engaged with an optical connector;

moving the sealing piston securing member away from a connector insertion path defined by the multiport assembly with the release tool;

disengaging the sealing piston securing member from the fiber optic connector; and removing the fiber optic connector from the multiport assembly through optical connector port of the multiport assembly.

20. The method of claim 19, wherein moving the sealing piston securing member away from the connector insertion path comprises overcoming a biasing force of a biasing member engaged with the sealing piston securing member.

* * * * *

UNITED STATES PATENT AND TRADEMARK OFFICE
CERTIFICATE OF CORRECTION

PATENT NO. : 10,768,382 B2  
APPLICATION NO. : 16/204382  
DATED : September 8, 2020  
INVENTOR(S) : Monique Lise Cote et al.

It is certified that error appears in the above-identified patent and that said Letters Patent is hereby corrected as shown below:

On the Title Page

On page 4, in Column 1, item (56), Other Publications, Line 18, delete "lopp" and insert -- loop --, therefor.

On page 4, in Column 1, item (56), Other Publications, Line 24, delete "Poeceedings" and insert -- Proceedings --, therefor.

Signed and Sealed this  
Twenty-ninth Day of December, 2020

Andrei Iancu  
*Director of the United States Patent and Trademark Office*